UNITED STATES PATENT OFFICE 2,050,925

PROCESS FOR BREAKING PETROLEUM EMULSIONS

Melvin De Groote, St. Louis, Mo., assignor to Tretolite Company, Webster Groves, Mo., a corporation of Missouri No Drawing. Application November 18, 1935, Serial No. 50,369

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive, and efficient process for separating emulsions of the kind referred to into their component parts of oil and water or brine.

Briefly described, my process consists in subjecting a petroleum emulsion to the action of a treating agent comprising a carboxylic amide corresponding to the general formula

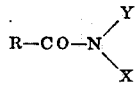

in which R—CO is the acyl radical of a detergent-forming carboxylic acid, Y is a hydrogen atom or an alkyl radical, and X is a sulfo-hydrocarbon radical of the type —R'.T.Z, in which R' is an alkyl residue, T is a sulfuric acid residue selected from the class consisting of $SO_3$ and $OSO_3$ radicals, and Z is an acidic hydrogen or its equivalent.

Detergent-forming carboxylic acids are of the type of acids which combine with alkalies such as caustic soda or caustic potash to produce soap or soap-like bodies. Well-known examples of such detergent-forming acids are fatty acids such as oleic acid, stearic acid, etc., as well as abietic acid, and various naphthenic acids. Petroleum carboxy acids are also derived by the oxidation of paraffin or petroleum wax and may be used to produce the treating agent contemplated by my process, provided that they are characterized by the fact that they combine with alkalies to form soap or soap-like materials.

The word "alkyl" is herein used to mean a monovalent organic radical and is not limited to monovalent alcoholic or hydrocarbon radicals derived solely from the fatty or paraffin series. It is used in a generic sense to include monovalent alphyl radicals, aryl radicals, cyclic radicals, and aralyphyl radicals. The word "alphyl" is herein used to refer to alkyl radicals derived solely from the fatty or paraffin series. The word "aromatic" or "aryl", as herein used, is intended to include hydro-aromatic materials or radicals. This nomenclature in regard to the use of the words "alkyl" and "alphyl" is not unusual. (See "Textbook of Organic Chemistry", Bernthsen, 1931 Ed., p. 394). The meaning of the word "aralphyl" is, of course, obvious.

Obviously the detergent acid of the type RCOOH, which supplies the acyl radical R—CO, may be subjected to any suitable modification which does not destroy its ability to form a soap or soap-like body. For instance, oleic acid may be chlorinated, and one might employ such chlorinated oleic acid instead of oleic acid, in producing the treating agent used in my process. Ricinoleic acid may be sulfated to produce sulforicinoleic acid, and this particular material may be employed. Rosin might be hydrogenated and such hydrogenated abietic acid might be employed. Naphthenic acids may be brominated, and such brominated naphthenic acids may be employed. In all cases, the modified form must still possess the detergent-forming characteristic of the unaltered parent acid. The words "detergent-forming acid" will hereafter be used in the sense to include not only such materials as naphthenic acids, fatty acids, abietic acids, etc., but also their modifications of the kind indicated as being equally suitable.

For simplicity, then, the treating agent used in my process may be described by the following formula:

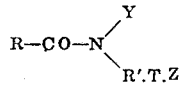

in which all the characters have their prior significance. Z, of course, can represent any hydrogen equivalent. Z may be a metallic atom, an acidic hydrogen atom, or an organic group derived from any kind of alcohol, or it may be an amine radical or residue derived from triethanolamine, monoamylamine, benzylamine, etc. The ammonium radical is considered as a metallic atom.

As to the manufacture of these materials, reference is made to U. S. Letters Patent No. 1,932,179 and No. 1,932,180, both being dated October 24, 1933, and both being issued to Guenther and Haussmann.

My preferred reagent or treating agent is made in the following manner:

Five hundred parts of cocoanut oil fatty acid anilide (obtained by reacting the mixture of fatty acids derived from cocoanut oil with aniline) are melted and introduced into one thousand parts of sulfuric acid monohydrate; one thousand parts of fuming sulfuric acid containing twenty-three percent sulfur trioxide are then introduced at 30–35° C., and the mixture is stirred at this temperature for four hours. At the end of four hours, the reaction mass is added slowly and with constant stirring to one thousand parts of cracked ice; this stirring is continued until the ice is all melted, and then allowed to stand until an upper layer has separated. The lower layer is withdrawn and the upper layer neutralized with strong caustic soda solution. The product, which is a mixture of the sulfonic acid sodium salts of the anilides of the different acids of cocoanut oil, corresponds to the following general formula:

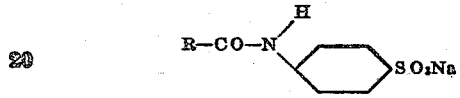

The formula is not intended to show a single substance as differentiated from various isomers, because the sulfonic group may be introduced at some other position in the benzene nucleus. This also applies to subsequent formulas, insofar that there is no intention to differentiate between isomeric forms.

In the example previously described, an equally satisfactory product may be obtained by substituting naphthylamine or toluidine in place of aniline.

Certain reagents suitable for use in the present process may be characterized by the presence of two sulfo groups, in that one sulfo group may be introduced into the R' nucleus, as indicated, and the other sulfo radical into the acyl group. It is to be emphasized that the introduction of a sulfo group into the hydrocarbon chain of the acyl group does not supply the sulfo portion of the molecule indicated by the character T. The introduction of such sulfo group in the hydrocarbon chain of the acyl group is not objectionable and may be desirable, provided that the corresponding sulfo acid is a detergent-forming acid.

As an example of the type previously mentioned, reference is made to the product obtained by sulfonating an oleic ethyl anilide, which is obtained by heating oleic acid and ethyl aniline until distillation of water has ceased. When oleic ethyl anilide is dissolved in an inert solvent such as trichlorethylene, and then sulfonated at approximately 0° C. with sulfuric acid monohydrate, one obtains a sulfated compound in which an acid sulfate group is introduced into the oleic acid radical or residue. This is not objectionable, because sulfo-oleic acid is a detergent-forming acid, as well as oleic acid. However, such a material does not represent a reagent of the type contemplated for use in the present process and must be subjected to further sulfonation by means of fuming sulfuric acid, in order that a sulfo group is introduced into the hydrocarbon $C_6H_6$ residue. The material obtained by such further sulfonation and neutralized with potash, for example, is of the following formula:

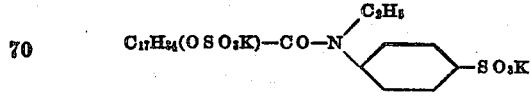

Effective reagents can be produced by reacting chlorides derived from fatty acids, for example, with a material such as allyl amine sulfate. If palmitic chloride is employed, one may obtain a reagent of the following formula:

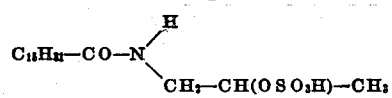

Similarly, monoethanolamine sulfuric ester can be reacted with stearic chloride so as to obtain a material of the following composition:

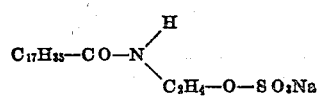

Oleic chloride may be similarly employed to give a material of the following composition:

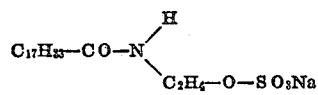

In the previous examples, naphthenic chloride obtained from naphthenic acids may be substituted for stearic, oleic, or palmitic chlorides.

U. S. Patent No. 1,932,180, previously referred to, gives additional examples of suitable reagents, or additional examples of materials which can readily be converted into suitable reagents. Among such suitable reagents described in said patent are the following nine examples:

*I*

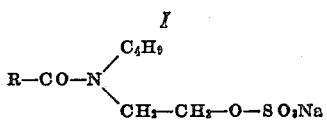

in which R—CO denotes acyl radicals of the fatty acids of cocoanut oil.

*II*

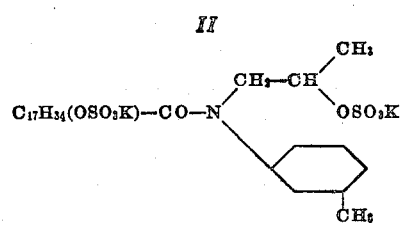

*III*

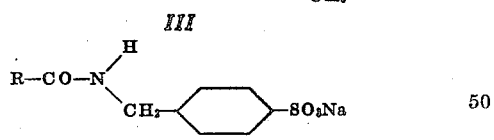

in which R—CO denotes naphthenic acid acyl radicals.

*IV*

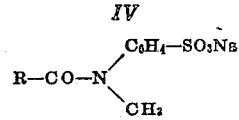

in which R—CO denotes acyl radicals of the acid obtained by oxidation of paraffin.

*V*

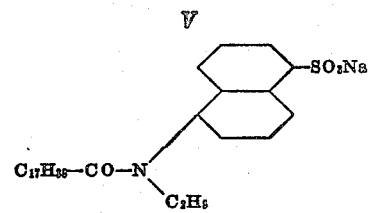

*VI*

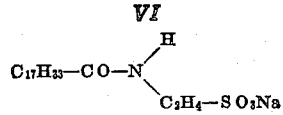

VII

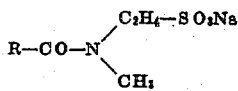

in which R—CO denotes the acyl radicals of the acids of cocoanut oil.

VIII

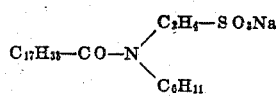

IX

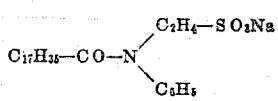

It is to be noted that all these compounds correspond to the general type formula previously mentioned, namely,

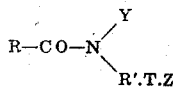

and it is to be noted that in each compound the hydrocarbon residue R' supplies the linkage between the sulfo group T and the nitrogen atom.

As previously remarked, wherever an acidic hydrogen exists, the material may be used as such, or the acidic hydrogen may be neutralized by any suitable base, such as caustic soda, caustic potash, ammonia, triethanolamine, monoamylamine, diamylamine, etc. The acidic material may be converted into an ester by the conventional method, so as to result in an aliphatic ester, aromatic ester, or an aralphyl ester. Esters produced in cyclic alcohols would, of course, be satisfactory. Such materials may be neutralized with lime, magnesia, etc. Water-soluble salts may be converted into water-insoluble salts by double decomposition employing water-soluble salts of iron, copper, aluminum, lead, etc. The reagents may be used in water-soluble form, oil-soluble form, or in such form that exhibits both oil and water solubility. The material may be used in a form which exhibits substantially neither water nor oil solubility in the ordinary sense of the word. This is possible because sometimes the reagent may be employed by addition in amounts equivalent to only one part in twenty thousand. Such extreme dilution requires solubility of a degree, which is so limited that such materials may ordinarily be classed as insoluble.

The specific form, state, or condition of the treating agent at the time it is used or applied to the emulsion to be treated is immaterial and may be varied to suit existing conditions. It can be used in substantially anhydrous state or in solutions of any convenient strength. The treating agent may be diluted with any suitable solvent, such as ethyl alcohol, methyl alcohol, isopropyl alcohol, butyl alcohol, kerosene, or any other hydrocarbon solvent, benzol, xylene, solvent naphtha, carbon tetrachloride, pine oil, etc.

These materials may be employed alone or in combination with other recognized demulsifying agents, such as water softeners, modified fatty acids, salts of petroleum sulfonic acids, alkylated aromatic sulfonic acids, derivatives of polybasic carboxy acids, and the like.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature of about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kind known as "tank bottoms", and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results.

In general, I have found that for an average petroleum emulsion, a ratio of 1 part of treating agent to 10,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a sulfocarboxylic amide body of the following formula type:

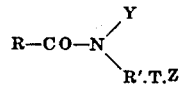

in which R—CO represents the acyl radical of a carboxylic detergent-forming acid, Y is a hydrogen atom or alkyl radical, R' is an alkyl residue, T is a sulfuric acid residue selected from the class consisting of $SO_3$ and $OSO_3$ radicals, and Z is an acidic hydrogen or its equivalent.

2. A process for breaking petroleum emulsions of the water-in-oil type, which consists in subjecting the emulsion to the action of a sulfocarboxylic amide body of the following formula type:

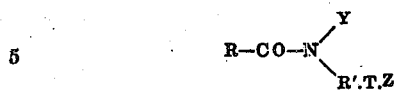

in which R—CO is the acyl radical of a fatty acid, Y is a hydrogen atom or alkyl radical, R' is an alkyl residue, T is a sulfuric acid residue selected from the class consisting of $SO_3$ and $OSO_3$ radicals, and Z is an acidic hydrogen or its equivalent.

3. A process for breaking petroleum emulsions of the water-in-oil type, which consists in subjecting the emulsion to the action of a sulfo-carboxylic amide body of the following formula type:

in which R—CO is the acyl radical of abietic acid, Y is a hydrogen atom or alkyl radical, R' is an alkyl residue, T is a sulfuric acid residue selected from the class consisting of $SO_3$ and $OSO_3$ radicals, and Z is an acidic hydrogen or its equivalent.

4. A process for breaking petroleum emulsions of the water-in-oil type, which consists in subjecting the emulsion to the action of a sulfo-carboxylic amide body of the following formula type:

in which R—CO is the acyl radical of a naphthenic acid, Y is a hydrogen atom or alkyl radical, R' is an alkyl residue, T is a sulfuric acid residue selected from the class consisting of $SO_3$ and $OSO_3$ radicals, and Z is an acidic hydrogen or its equivalent.

5. A process for breaking petroleum emulsions of the water-in-oil type, which consists in subjecting the emulsion to the action of a sulfo-carboxylic amide body of the following formula type:

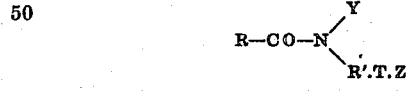

in which R—CO is the acyl radical of a fatty acid, Y is an alkyl radical, R' is an alkyl residue, T is a sulfuric acid residue selected from the class consisting of $SO_3$ and $OSO_3$ radicals, and Z is an acidic hydrogen or its equivalent.

6. A process for breaking petroleum emulsions of the water-in-oil type, which consists in subjecting the emulsions to the action of a sulfo-carboxylic amide body of the following formula type:

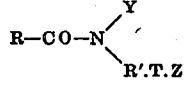

in which R—CO is the acyl radical of a fatty acid, Y is an alkyl radical, R' is an aromatic residue, T is a sulfuric acid residue selected from the class consisting of $SO_3$ and $OSO_3$ radicals, and Z is an acidic hydrogen or its equivalent.

7. A process for breaking petroleum emulsions of the water-in-oil type, which consists in subjecting the emulsion to the action of a sulfo-carboxylic amide body of the following formula type:

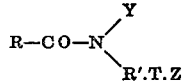

in which R—CO is the acyl radical of a fatty acid, Y is an alkyl radical, R' is an aromatic residue, T is a sulfuric acid residue selected from the class consisting of $SO_3$ and $OSO_3$ radicals, and Z is a metallic atom.

8. A process for breaking petroleum emulsions of the water-in-oil type, which consists in subjecting the emulsion to the action of a sulfo-carboxylic amide body of the following formula type:

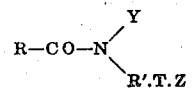

in which R—CO is the acyl radical of a fatty acid, Y is an alkyl radical, R' is an aromatic residue, T is a sulfuric acid residue selected from the class consisting of $SO_3$ and $OSO_3$ radicals, and Z is a sodium atom.

9. A process for breaking petroleum emulsions of the water-in-oil type, which consists in subjecting the emulsion to the action of a sulfo-carboxylic amide body of the following formula type:

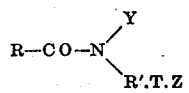

in which R—CO is the acyl radical of a fatty acid, Y is an alkyl radical, R' is an aromatic residue, T is an $SO_3$ radical and Z is a sodium atom.

10. A process for breaking petroleum emulsions of the water-in-oil type, which consists in subjecting the emulsion to the action of a reagent of the composition denoted by the following formula:

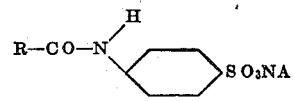

in which R—CO denotes the acyl radicals of fatty acids of cocoanut oil.

MELVIN DE GROOTE.